(12) United States Patent
Miwa

(10) Patent No.: US 6,928,240 B2
(45) Date of Patent: Aug. 9, 2005

(54) CAMERA

(75) Inventor: Yasuhiro Miwa, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 10/809,805

(22) Filed: Mar. 26, 2004

(65) Prior Publication Data

US 2004/0202462 A1 Oct. 14, 2004

(30) Foreign Application Priority Data

Mar. 27, 2003 (JP) .................................. P2003-088640

(51) Int. Cl.⁷ .................... G03B 7/097; G03B 13/36
(52) U.S. Cl. .................... 396/106; 396/120; 396/243
(58) Field of Search .......................... 396/65–70, 103, 396/106, 120, 242, 243, 257–263

(56) References Cited

U.S. PATENT DOCUMENTS

| | | | |
|---|---|---|---|
| 4,593,987 A | * 6/1986 | Takahashi et al. | 396/120 |
| 4,773,751 A | 9/1988 | Matsuda et al. | |
| 5,444,511 A | * 8/1995 | Seki et al. | 396/99 |
| 5,742,524 A | * 4/1998 | Ito et al. | 250/201.4 |
| 6,026,246 A | 2/2000 | Yoshida et al. | |
| 6,421,115 B2 | * 7/2002 | Yoshida et al. | 356/3.04 |

FOREIGN PATENT DOCUMENTS

JP 2-67529 7/1990

* cited by examiner

Primary Examiner—W. B. Perkey
(74) Attorney, Agent, or Firm—Leydig, Voit & Mayer, Ltd.

(57) ABSTRACT

A camera includes a light emitter, a light detector, a clamp circuit, a calculator for outputting an output ratio signal, a converter for converting the output ratio signal into a distance signal corresponding to the distance or a predetermined fixed value, a light meter for measuring the luminance of outside light, and an exposure control that, when the luminance of the outside light measured by the light meter is lower than a predetermined switchover luminance, controls the aperture of the camera lens to a released aperture value, and when higher than the predetermined switchover luminance, controls the aperture of the camera lens to increase corresponding to the luminance. A first auto-focus (AF) signal value corresponds to an infinity determination distance and a second AF signal value corresponds to the switchover luminance. The AF signal value, which corresponds to the shorter range, is set as an infinity determination threshold value.

5 Claims, 15 Drawing Sheets

CAMERA

BACKGROUND OF THE INVENTION

1. Field of the Invention

The present invention relates to a camera equipped with a distance measuring device.

2. Related Background Art

Conventionally, as a camera, which is equipped with an active type distance measuring device, a camera disclosed in Japanese Unexamined Patent Application publication No. H-02-067529, is known. FIG. 15 is a graph showing a relationship between the distance to an object to be measured and distance signal (distance measuring property) in the distance measuring device. The broken lines in FIG. 15 represent the limits of a range of permissible circle of confusion, which means a permissible range of out-of-focus. Also, the width in the direction of the ordinate axis of these broken lines means the depth of focus at that distance. The camera is arranged so that the exposure control program in the camera is switched over depending on the distance measured by a distance measuring device, and thereby poor accuracy at a long range is compensated (refer to FIG. 15).

That is, this camera is arranged so that, in a short range where a satisfactory accuracy in the distance measurement is ensured (a range shorter than 1/L=0.13 in FIG. 15), a first exposure control program is used to release the aperture of lens; in a long range where the accuracy in the distance measurement is poor (a range longer than 1/L=0.13 in FIG. 15), a second exposure control program is used to narrow down the aperture of lens; thereby the depth of focus is increased to avoid out-of-focus.

[Patent Document 1]
Japanese Unexamined Patent Application publication (Tokukai) No. H-02-067529

[Patent Document 2]
Japanese Unexamined Patent Application publication (Tokukai) No. H-10-281756

SUMMARY OF THE INVENTION

However, in the above-mentioned camera, in the long range side in which the aperture of lens is narrowed down, the shutter speed is reduced resulting in a problem in photographing performance. Particularly, in a camera having a dark open F-value and a camera having a weak AF projection beam, the problem becomes further considerable.

Accordingly, an object of the present invention is to solve the above described problems and to provide a camera capable of appropriately controlling the focusing operation by performing an appropriate infinity determination while ensuring the shutter speed of the camera.

In order to solve the above-described problem, a camera in accordance with the present invention comprises light emitting means that outputs a beam of light to an object to be measured; light receiving means that receives reflected light of the beam of light projected onto the object to be measured at a light receiving position corresponding to a distance to the object to be measured, and based on the light receiving position, outputs a long-range side signal such that, if the received light amount is constant, the longer distance results in the larger value and a short-range side signal such that, if the received light amount is constant, the shorter distance results in the larger value; clamping means that inputs the long-range side signal to compare the magnitude of level between the long-range side signal and a clamp signal; when the level of the long-range side signal is larger than the level of the clamp signal, outputs the long-range side signal as it is; and when the long-range side signal is not larger than the level of the clamp signal, outputs the clamp signal; calculation means that calculates the ratio between the short-range side signal and the signal output from the clamping means to output an output ratio signal; conversion means that, when the output ratio signal is the signal corresponding to the short range side shorter than the infinity determination threshold value, converts the output ratio signal into a distance signal corresponding to the distance, and when the output ratio signal is not the signal corresponding to the short range side shorter than the infinity determination threshold value, converts the same into a predetermined distance signal having a fixed value; luminance measuring means that measures the luminance of the outside light; and exposure control means that, when the luminance of the outside light measured by the luminance measuring means is lower than a predetermined switchover luminance, which is determined in accordance with film sensitivity, controls the aperture value of lens to released aperture value; and when the luminance of the outside light is higher than the predetermined switchover luminance, controls the aperture value of lens to increase corresponding to the increase of the luminance, and is characterized in that, in a first AF signal value corresponding to the infinity determination distance, which is set up as a measurable limit distance and a second AF signal value corresponding to the switchover luminance, the AF signal value which is closer to the short range is set up as the infinity determination threshold value.

Depending on the difference or the like of the product of camera, there may be a case where the second AF signal value is larger than the first AF signal value. In this case, according to the above-described distance measuring device, the second signal value is set up as the infinity determination threshold value. Accordingly, when the obtained AF signal value is in the long range longer than the distance capable of distinguishing the noise from the AF signal, even when the distance is shorter than a designed infinity determination distance, the infinity determination is always carried out; thus, the AF signal value is converted into a predetermined distance signal having a fixed value by the conversion means. Accordingly, an appropriate infinity determination can be carried out. Therefore, in addition to appropriate infinity determination, impermissible error in the distance measurement can be prevented resulting in an appropriate focusing.

Furthermore the camera in accordance with the present invention comprises light emitting means that outputs a beam of light to an object to be measured; light receiving means that receives reflected light of the beam of light projected onto the object to be measured at a light receiving position corresponding to a distance to the object to be measured, and based on the light receiving position, outputs a long-range side signal such that, if the received light amount is constant, the longer distance results in the larger value and a short-range side signal such that, if the received light amount is constant, the shorter distance results in the larger value; clamping means that inputs the long-range side signal to compare the magnitude of level between the long-range side signal and a clamp signal; when the level of the long-range side signal is larger than the level of the clamp signal, outputs the long-range side signal as it is; and when the long-range side signal is not larger than the level of the clamp signal, outputs the clamp signal; calculation means that calculates the ratio between the short-range side signal and the signal output from the clamping means to output an output ratio signal; conversion means that, when the output ratio signal is the signal corresponding to the short range side shorter than the infinity determination threshold value, converts the output ratio signal into a distance signal corresponding to the distance, and when the output ratio signal is not the signal corresponding to the short range side shorter than the infinity determination threshold value, converts the same into a predetermined distance signal having a fixed value; luminance measuring means that measures the luminance of the outside light; exposure control means that, when the luminance of the outside light measured by the luminance measuring means is lower than a predetermined switchover luminance, which is determined in accordance with film sensitivity, controls the aperture value of lens to released aperture value; and when other than that, controls the aperture value of lens to increase corresponding to the increase of the luminance, and is characterized in that a second AF signal value corresponding to the switchover luminance is set up as the infinity determination threshold value, and infinity signal value, which is a distance signal value corresponding to a infinity set distance, is within the range of a distance signal value corresponding to the range of permissible circle of confusion in the infinity determination distance, which is the nearest distance in the distance subjected to the infinity determination.

In the case where, the second AF signal value is set up as the infinity determination threshold value, when an infinity determination is carried out, the range of permissible circle of confusion is apt to be exceeded. In the above-described camera, the infinity signal value, which is a distance signal value corresponding to the infinity set distance, is within the range of the distance signal value corresponding to the range of permissible circle of confusion in the infinity determination distance, which is the nearest distance in the distance subjected to the infinity determination. Therefore, error does not occur except for error in distance measurement of permissible range. Accordingly, in addition to an appropriate infinity determination, impermissible error in distance measurement can be prevented resulting in an appropriate focusing. Here, the wording "range of permissible circle of confusion," means an allowable range of previously designed distance error due to error in distance measurement and error in AF signal and distance signal.

DESCRIPTION OF THE PREFERRED EMBODIMENTS

Figure 1:
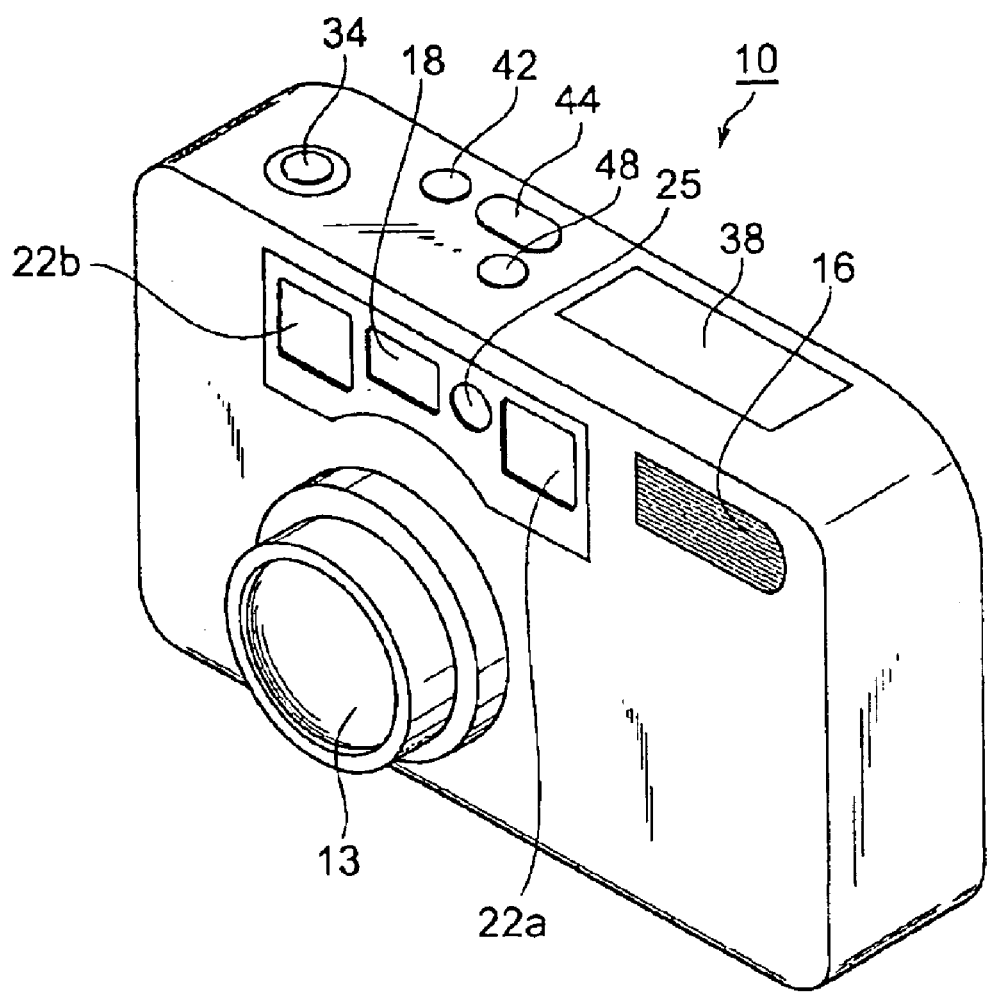
FIG. 1 is a perspective view of the front elevation of the camera to which the present invention is applied.

Preferred embodiments of a camera in accordance with the present invention will be described. Identical elements will be given with identical reference numerals and letters, and redundant descriptions will be omitted.

FIG. 1 is a perspective view of the front elevation of a camera to which a distance measuring device in accordance with the present invention is applied. As shown in FIG. 1, the camera 10 comprises a zoom lens barrel 13 provided with a photographic lens for imaging an object image on a silver film, an electric flash light emitting window 16 from which electric flash light is emitted, a viewfinder window 18 through which a photographer checks an object, an AF window 22 in which an active type AF sensor for measuring the distance of the object is incorporated therein, a photometry window 25 in which a photometry sensor for measuring the luminance of the object is incorporated, a shutter button 34 which the photographer operates to give instruction of shutter release, and so on.

Figure 2:
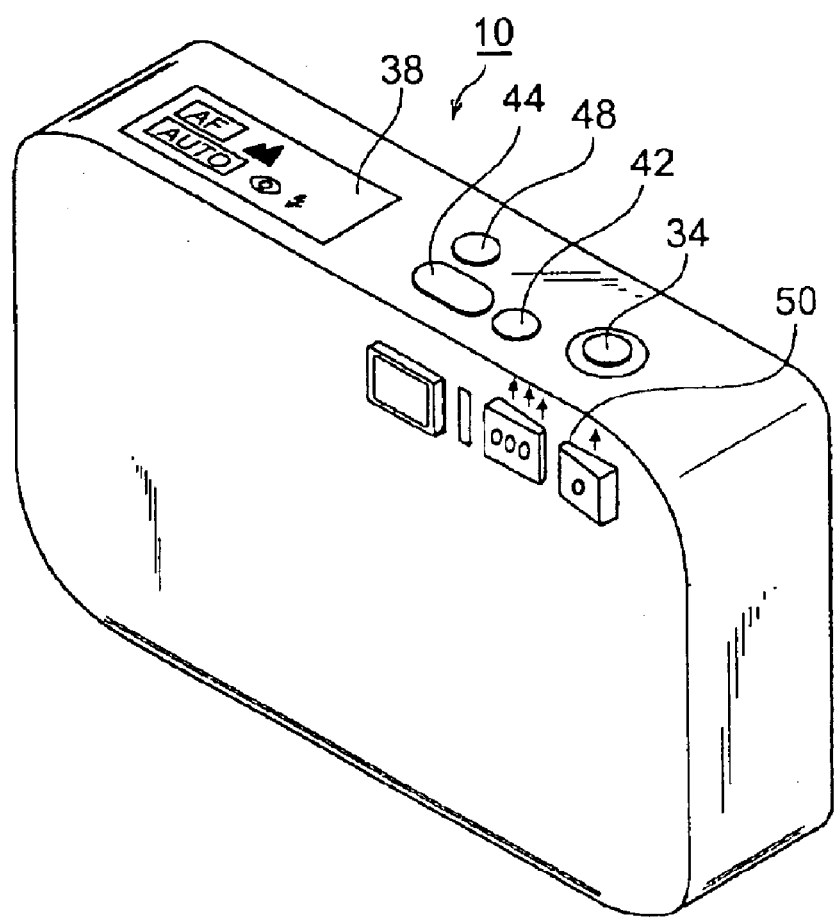
FIG. 2 is a perspective view of the rear elevation of the camera to which the present invention is applied.

FIG. 2 is a perspective view of the rear elevation of the camera 10. As shown in FIG. 2, the camera 10 comprises an LCD display panel 38 that displays a selected photographing mode or the like and date information or the like, a flash button 42 for setting light emitting mode of the electric flash, a self timer button 44 for setting the mode of self timer, a date button 48 for setting date and time, and a zoom button 50 thereby instruction of the photographing angle in the wide scope direction or in the telescope direction is given.

Figure 3:
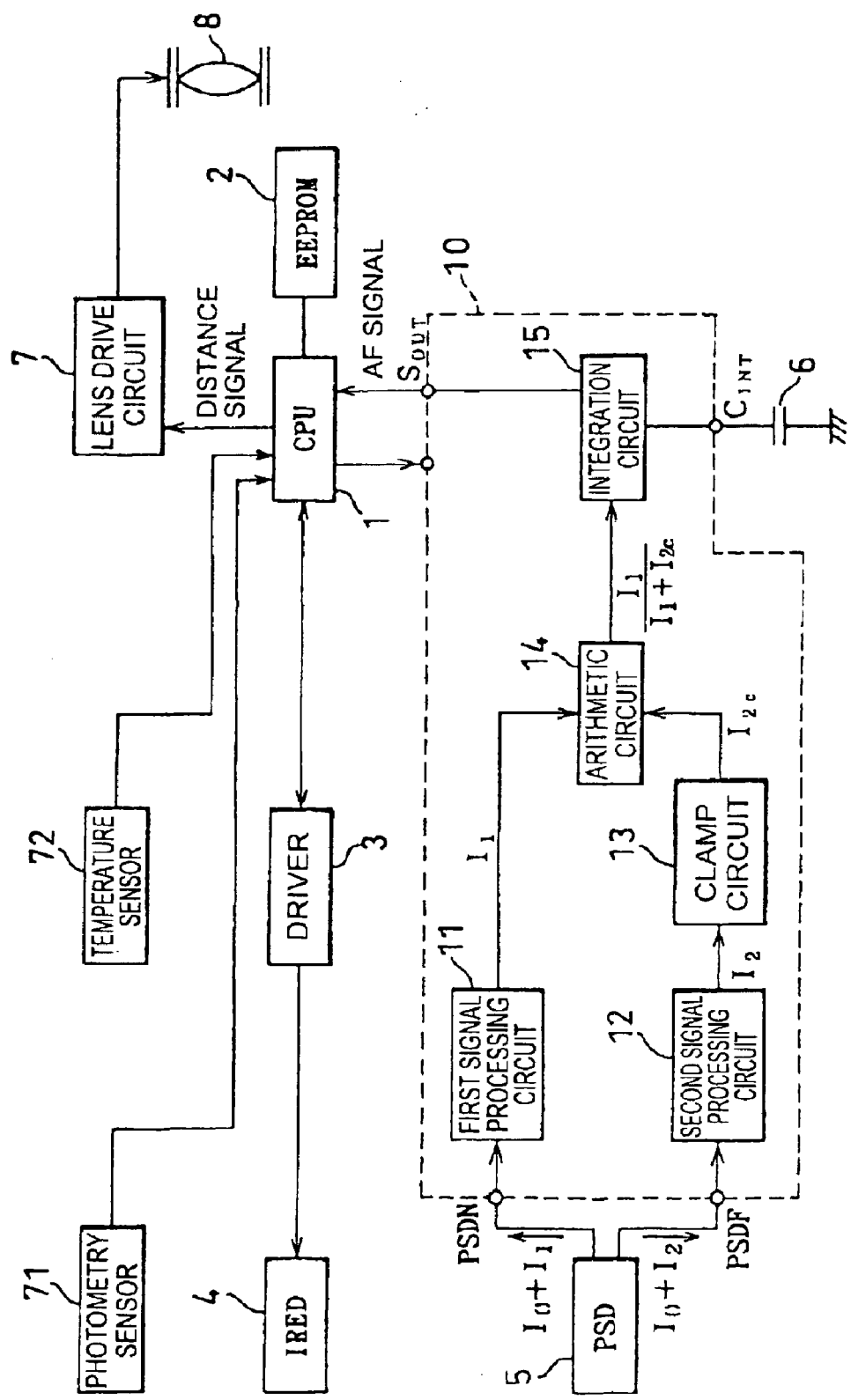
FIG. 3 is a diagram showing a configuration of a distance measuring device of the camera in accordance with the embodiment.

FIG. 3 is a diagram showing a configuration of a distance measuring device, which is incorporated in the camera in accordance with this embodiment. A CPU 1 controls the entire camera that is provided with the distance measuring device. The CPU 1 controls the entire camera including the distance measuring device based on program and parameter, which are previously stored in an EEPROM 2. In the distance measuring device shown in FIG. 3, the CPU 1 controls a driver 3 to control the emission of the infrared light from an IRED 4, and inputs a value of the power supply voltage, which is supplied to the driver 3 (or, power supply voltage, which is obtained from the drive current supplied from the driver 3 to the IRED 4). Also, the CPU 1 controls the operation of an auto-focusing IC (hereinafter, referred to as "AFIC") 10, and inputs AF signal, which is output from the AFIC 10. Further, the CPU 1 inputs a value of luminance of the outside light, which is measured by a photometry sensor 71; and inputs a value of temperature, which is measured by a temperature sensor 72. As for the power supply voltage, it is not limited to the driver 3 or IRED 4, but voltage of a battery may be directly measured; or voltage supplied to other component part may be measured.

The infrared light emitted from the IRED 4 is projected onto an object to be measured through a projection lens (not shown), which is disposed in front of the IRED 4, and a portion thereof is reflected. The reflected light is received at any position on the light receiving plane of the PSD 5 through a light receiving lens (not shown) disposed in front of the PSD 5. The light receiving position corresponds to the distance to the object to be measured. The PSD 5 out-puts two signals I1 and I2 corresponding to the light receiving position. The signal I1 is a short-range side signal, in which, if the received light amount is constant, the closer distance results in the larger value; the signal I2 is a long-range side signal, in which, if the received light amount is constant, the longer distance results in the larger value. The sum of the signals I1 and I2 represents the amount of the reflected light received by the PSD 5. The output ratio (I1/(I1+I2)) represents the light receiving position on the light receiving plane of the PSD 5; i.e., the distance to the object to be measured. The short-range side signal I1 is input to the PSDN terminal of the AFIC 10; the long-range side signal I2 is input to the PSDF terminal of the AFIC 10. However, practically, there may be a case where a signal, in which each of the short-range side signal I1 and the long-range side signal I2 is added with component of ambient light I0 depending on the external conditions, is input to the AFIC 10.

The AFIC 10 is an integrated circuit (IC) and comprises a first signal processing circuit 11, a second signal processing circuit 12, a clamp circuit 13, an arithmetic circuit 14 and an integration circuit 15. The first signal processing circuit 11 inputs the signal I1+I0, which is output from the PSD 5, and after removing the component of the ambient light I0 included in the signal, outputs the short-range side signal I1; the second signal processing circuit 12 inputs the signal I2+I0, which is output from the PSD 5, and after removing the component of ambient light I0 included in the signal, outputs the short-range side signal I2.

The clamp circuit 13 inputs the long-range side signal I2, which is output from the second signal processing circuit 12, and compares the magnitude of the level between the clamp signal Ic, which is constant, and the long-range side signal I2, and when the former is larger, the clamp signal Ic is output; and if not so, the long-range side signal I2 is output as it is. Hereinafter, the signal output from the clamp circuit 13 is denoted by I2c. Here, it is assumed that the clamp signal Ic is substantially at the same level as that of the long-range side signal I2 corresponding to the distance L4 shown in FIG. 7.

The arithmetic circuit 14 inputs the short-range side signal I1, which is output from the first signal processing circuit 11, and the signal I2c, which is output from the clamp circuit 13 (any one of the long-range side signal I2 and the clamp signal Ic), calculates the output ratio (I1/(I1+I2c)), and outputs the result thereof. The integration circuit 15 inputs the output ratio and integrates the output ratio multiple times along with an integration capacitor 6, which is connected to the CINT terminal of the AFIC 10; thereby the S/N ratio is improved. Then, the integrated output ratio is output from the SOUT terminal of the AFIC 10 as AF signal.

The CPU 1 inputs the AF signal output from the AFIC 10, performs a predetermined calculation to convert the AF signal into a distance signal, and sends the distance signal to a lens drive circuit 7. The lens drive circuit 7 makes a photo-taking lens 8 perform focusing operation based on the distance signal. The conversion calculation from the AF signal to the distance signal in the CPU 1 will be described later.

Figure 4:
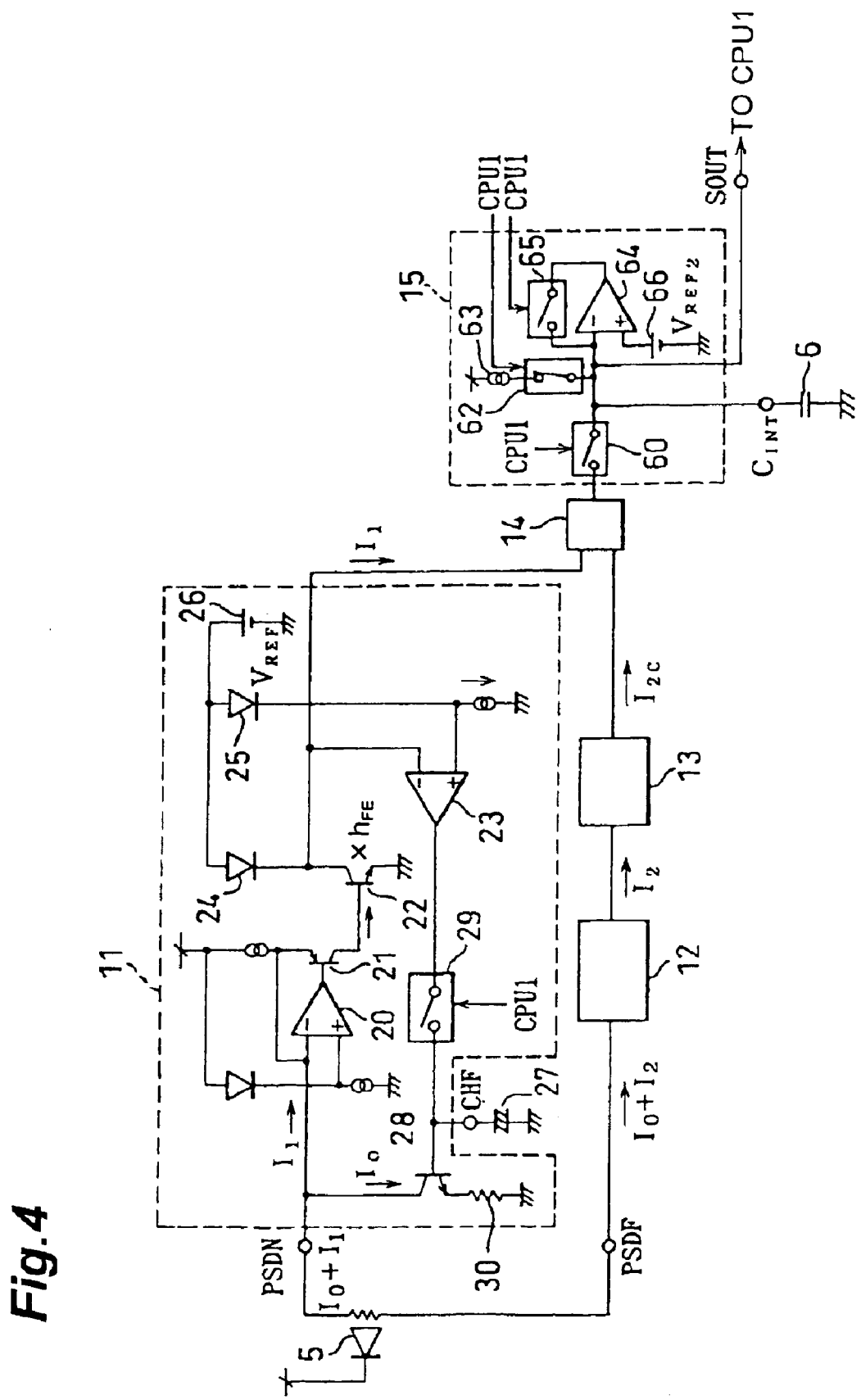
FIG. 4 is a diagram of the circuits of the first signal processing circuit and the integration circuit in the distance measuring device in accordance with the embodiment.
Figure 5:
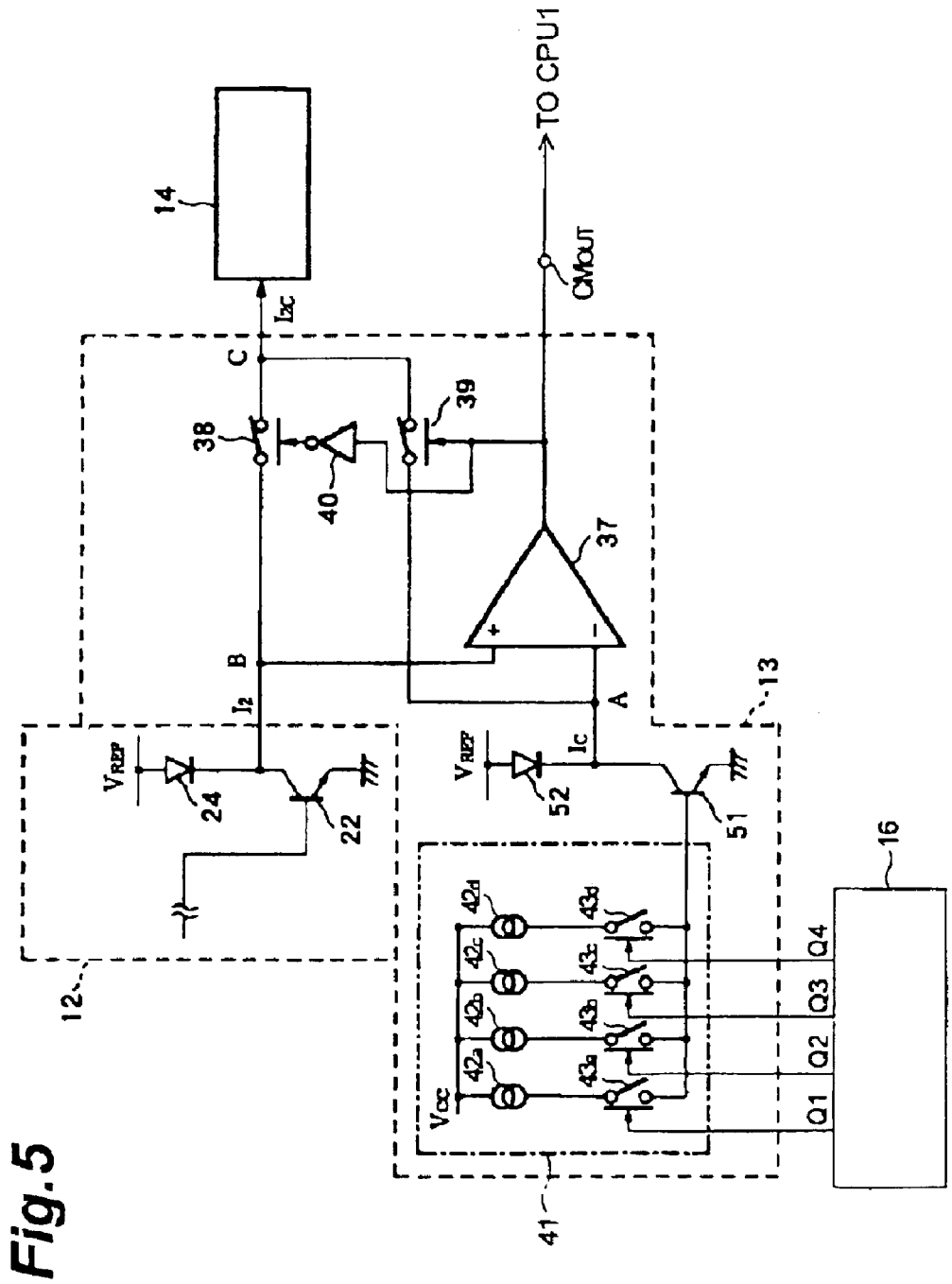
FIG. 5 is a diagram of the circuit of the clamp circuit in the distance measuring device in accordance with the embodiment.

Next, further concrete configuration of the circuits of the first signal processing circuit 11, the clamp circuit 13 and the integration circuit 15 in the AFIC 10 will be described. FIG. 4 is a circuit diagram of the first signal processing circuit 11 and the integration circuit 15 in the distance measuring device in accordance with the embodiment. FIG. 5 is a circuit diagram of the clamp circuit 13 in the distance measuring device in accordance with the embodiment. The second signal processing circuit 12 also has the same configuration of the circuit as that of the first signal processing circuit 11.

FIG. 4 shows the circuit diagram of the first signal processing circuit 11. The first signal processing circuit 11 inputs the short-range side signal I1 including the component of the ambient light I0, which is output from the PSD 5, and after removing the component of the ambient light I0, outputs the short-range side signal I1. The current (I1+I0), which is output from the near-side terminal of the PSD 5, is input to the –input terminal of an operational amplifier 20 in the first signal processing circuit 11 through the PSDN terminal of the AFIC 10. The output terminal of the operational amplifier 20 is connected to the base terminal of a transistor 21; and the collector terminal of the transistor 21 is connected to the base terminal of the transistor 22. Connected to the collector terminal of the transistor 22 is the –input terminal of the operational amplifier 23; and connected to the collector terminal is the cathode terminal of a compression diode 24. Further, connected to the +input terminal of the operational amplifier 23 is the cathode terminal of a compression diode 25; and connected to the anode terminal of each of the compression diodes 24 and 25 is a first reference power supply 26.

Further, externally connected to the CHF terminal of the AFIC 10 is an ambient light removal capacitor 27. The ambient light removal capacitor 27 is connected to the base terminal of an ambient light removal transistor 28 in the first signal processing circuit 11. The ambient light removal capacitor 27 and the operational amplifier 23 are connected to each other being interposed by a switch 29. The CPU 1 controls the ON/OFF operation of the switch 29. The collector terminal of the ambient light removal transistor 28 is connected to the –input terminal of the operational amplifier 20. The emitter terminal of the transistor 28 is connected to a resistance 30 of which another terminal is grounded.

FIG. 5 is a diagram showing a concrete configuration of the clamp circuit 13 in the AFIC 10. As shown in FIG. 5, the clamp circuit 13 is provided with a comparator 37 for determining the level of the long-range side signal $I_2$. The +input terminal of the comparator 37 is connected to the collector terminal of the transistor 22 in the second signal processing circuit 12, and connected to the input terminal of the arithmetic circuit 14 being interposed by a switch 38. On the other hand, the –input terminal of the comparator 37 is, same as the transistor 22 and the compression diode 24, which are connected to the +input terminal, connected to the collector terminal of the transistor 51 and the cathode terminal of the compression diode 52, and further connected to the input terminal of the arithmetic circuit 14 being interposed by a switch 39.

Further, connected to the base terminal of the transistor 51 is a clamp current source 41. To the clamp current source 41, a current generator 42a and a switch 43a are connected in series; a current generator 42b and a switch 43b are connected in series; a current generator 42c and a switch 43c are connected in series; and a current generator 42d and a switch 43d are connected in series; and the other ends of the switches 43a–43d are connected to the base terminal of the transistor 51.

For example, the current generator 42a, which outputs a constant current value of 0.125 nA; the current generator 42b, which outputs a constant current value of 0.25 nA; the current generator 42c, which outputs a constant current value of 0.5 nA; and the current generator 42d, which outputs a constant current value of 1.0 nA are used.

The switches 43a–43d are opened/closed being controlled by signals Q1–Q4, which are output from the clamp level switchover circuit 16. The clamp current source 41 inputs the clamp current, which is the sum of the currents from each of the current generators corresponding to the closed switches, to the base terminal of the transistor 51. The clamp current is used as the base current for the transistor 51; and collector potential corresponding to the magnitude thereof is input to the −input terminal of the comparator 37. The clamp current is appropriately set up during the manufacture of the distance measuring device.

Further, connected to the switch 39 is the output terminal of the comparator 37, and the output signal of the comparator 37 is input thereto. Furthermore, connected to the switch 38 being interposed by an inverter 40 is the output terminal of the comparator 37, and the output signal of the comparator 37 is inverted and input thereto. Accordingly, the switches 38 and 39 are in a relationship in which, when one is turned on, the other is turned off owing to the output signal of the comparator 37.

Further, the output signal of the comparator 37 is output from the AFIC 10 through the $CM_{OUT}$ terminal and input to the CPU 1. When the long-range side signal $I_2$ input to the +input terminal is larger than the clamp signal Ic input to the −input terminal, the output signal of the comparator 37 becomes a high potential signal. Contrarily, when the long-range side signal $I_2$ input to the +input terminal is smaller than the clamp signal Ic input to the −input terminal, the output signal of the comparator 37 becomes a low potential signal.

Therefore, the comparator 37 serves as output signal detection means that detects whether the output signal $I_{2C}$, which is output from the clamp circuit 13, is the long-range side signal $I_2$ or the clamp signal Ic.

The circuit configuration of the integration circuit 15 is shown in FIG. 4. The integration capacitor 6, which is externally connected to the CINT terminal of the AFIC 10, is connected to the output terminal of the arithmetic circuit 14 being interposed by a switch 60; connected to the current generator 63 being interposed by a switch 62; connected to the output terminal of the operational amplifier 64 being interposed by a switch 65; and further connected directly to the −input terminal of the operational amplifier 64. The potential of the integration circuit 15 is output from the SOUT terminal of the AFIC 10. These switches 60, 62 and 65 are controlled by the control signal from the CPU 1. Further, connected to the +input terminal of the operational amplifier 64 is a second reference power supply 66.

The operation of the AFIC 10, which is constituted as described above, will be described with reference to FIG. 4 and FIG. 5. When the light is not emitted from the IRED 4, the CPU 1 turns on the switch 29 of the first signal processing circuit 11. Here, the component of the ambient light I0, which is output from the PSD 5 is input to the first signal processing circuit 11, the current thereof is amplified by the current amplifier, which is comprised of the operational amplifier 20 and transistors 21 and 22, subjected to a logarithmic compression by the compression diode 24 to be converted into a voltage signal, and the voltage signal is input to the −input terminal of the operational amplifier 23. When the signal input to the operational amplifier 20 is large, since the VF of the compression diode is large, the signal output from the operational amplifier 23 is large. Accordingly, the capacitor 27 is charged. Then, since the base current is supplied to the transistor 28, the collector current flows to the transistor 28. Thus, in the signal I0, which has been input to the first signal processing circuit 11, the signal, which is input to the operational amplifier 20, is small. In this state where the closed loop operation is stable, the entire signal I0, which has been input to the first signal processing circuit 11 flows into the transistor 28, and in the capacitor 27, the electric charge corresponding to the base current at that time is accumulated.

When the CPU 1 makes the IRED 4 emit light and the switch 29 turn off, the component of ambient light I0 in the signal I1+I0, which is output from the PSD 5, flows to the transistor 28, which has been applied with the base potential due to the electric charge accumulated in the capacitor 27, as the collector current. The current of the short-range side signal I1 is amplified by the current amplifier, which is comprised of the operational amplifier 20 and the transistors 21 and 22, subjected to a logarithmic compression by the compression diode 24, converted into a current signal and output therefrom. That is, from the first signal processing circuit 11, only the short-range side signal I1, from which the component of the ambient light I0 has been removed, is output. The short-range side signal I1 is input to the arithmetic circuit 14. On the other hand, in the second signal processing circuit 12 also, same as the first signal processing circuit 11, only the long-range side signal I2, from which the component of the ambient light I0 has been removed, is output, and the long-range side signal 12 is input to the clamp circuit 13.

The long-range side signal I2, which has been input to the clamp circuit 13, is input to the +input terminal of the comparator 37 for determination in the clamp circuit 13. The signal output from the clamp current source 41, which has been previously set up during the adjustment of the camera, flows as the base current for the transistor 51; and the potential (clamp signal Ic) of the collector terminal in the transistor 51, which is generated accompanying therewith, is input to the −input terminal of the comparator 37 for determination. The magnitude of the long-range side signal I2 and the clamp signal Ic are compared by the comparator 37 for determination, and based on the result thereof, one of the switches 38 and 39 is turned on, and the other is turned off. That is, when the long-range side signal I2 is larger than the clamp signal Ic, the switch 38 is turned on, the switch 39 is turned off, and the long-range side signal I2 is output as the output signal 12c of the clamp circuit 13. When the relationship of the magnitude thereof is inversed, the switch 38 is turned off, the switch 39 is turned on, and the clamp signal Ic is output as the output signal 12c of the clamp circuit 13.

The signal I2c output from the clamp circuit 13 and the short-range side signal I1 output from the first signal processing circuit 11 are input to the arithmetic circuit 14, the output ratio $(I1/(I1+I2c))$ is calculated by the arithmetic circuit 14 and output therefrom, and the output ratio is input to the integration circuit 15. At the beginning of the distance measurement, the switches 60 and 62 are turned off, and the switch 65 is turned on for a predetermined period of time, and the integration capacitor 6 is charged to a potential of the reference voltage $V_{REF2}$ in the second reference power supply 66. When the IRED 4 emits the pulse light predetermined number of times, the switch 60 of the integration circuit 15 is turned on; the switches 62 and 65 are turned off; the integration capacitor 6 is discharged and integrated by the output ratio signal, which is output from the arithmetic circuit 14; and the potential of the integration capacitor 6 is reduced in a step manner. And, when the emission of the pulse light of predetermined number of times is completed, the switch 60 is turned off; and the switch 62 is turned on; thus, the potential of the integration capacitor 6 is charged and increased by inversed integration using a constant current, which is supplied from the current generator 63. The CPU 1 monitors the potential of the integration capacitor 6 and measures the time required for recovering the potential of the original potential $V_{REF2}$; calculates the AF signal based on the time, and further calculates the distance to the object to be measured.

Figure 6:
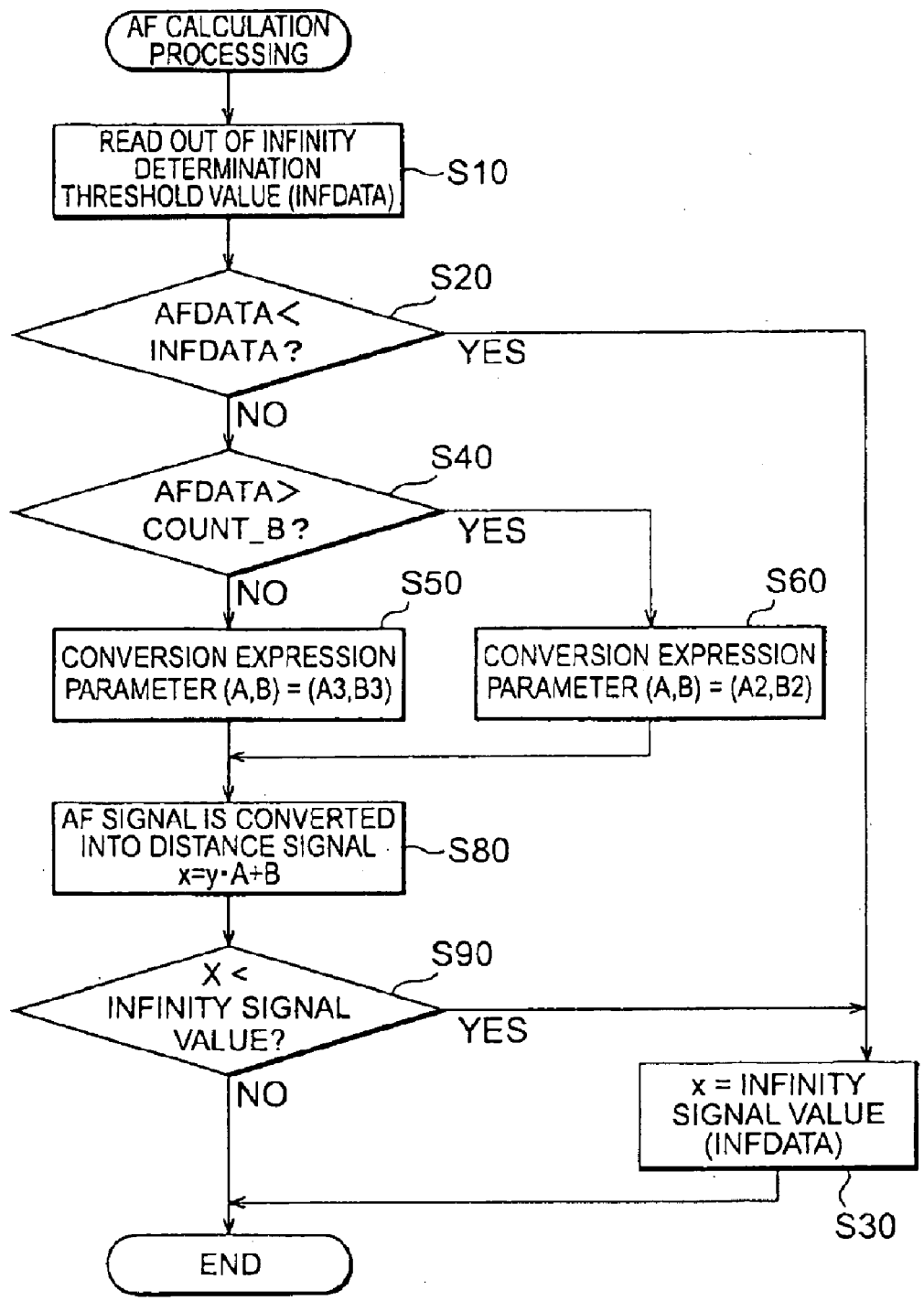
FIG. 6 is a flow chart of distance signal calculation process.

Here, the process to calculate the distance signal (hereinafter, expressed by "x") from the obtained AF signal (hereinafter, expressed by "y") in the CPU 1 will be described with reference to FIG. 6.

First of all, the CPU 1 reads out the infinity determination threshold value, which is previously stored in the EEPROM 2 or the like (step S10). When the AF signal obtained from the AFIC 10 is smaller than the above-described infinity determination threshold value (at the long range side), the infinity signal value (AFINF) is set as the distance signal and the processing is terminated (step S20, step S30). It is arranged so that, when the obtained AF signal is longer than a predetermined distance, the above-described processing is carried out; and thereby, an appropriate infinity determination is carried out. Here, the wording "infinity determination threshold value" means a value of the AF signal that, when a AF signal of the long range side longer than this value is obtained, converts the distance signal "x" into a predetermined fixed value (infinity signal value, AFINF), and is previously set up by way of adjustment of the camera, which will be described later, and stored in the EEPROM 2 or the like.

Figure 7:
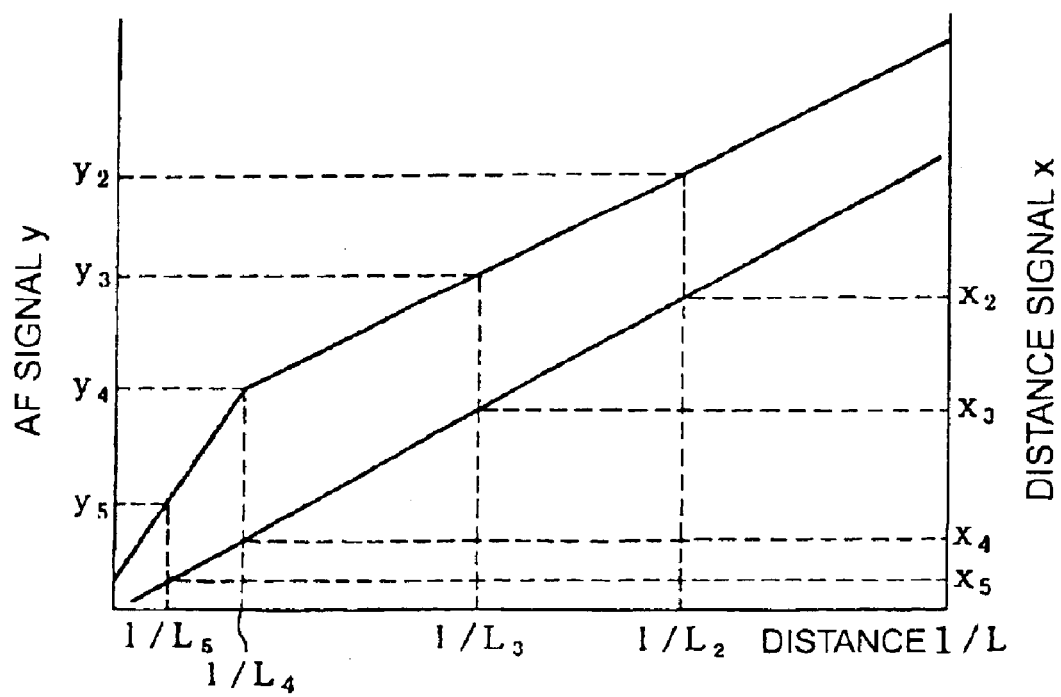
FIG. 7 is a diagram for illustrating the conversion from the AF signal to the distance signal in the distance measuring device in accordance with the embodiment.

Then, the conversion expression from the AF signal to the distance signal is determined (step S40). FIG. 7 is a diagram for illustrating the conversion from the AF signal to the distance signal in the distance measuring device in accordance with the embodiment. In the graph shown in FIG. 7, the abscissa axis represents reciprocal (1/L) of the distance L to the object to be measured; the left ordinate axis represents the AF signal; and the right ordinate axis represents the distance signal. Also, the graph indicates the relationship between the distance L and the AF signal and the relationship between the distance L and the distance signal respectively. Particularly, with respect to each of the distances L2, L3, L4 and L5 (L2<L3<L4<L5), the AF signals y2, y3, y4 and y5 correspond thereto respectively; and the distance signals x2, x3, x4 and x5 correspond thereto respectively. The conversion expression for converting the AF signal "y" into the distance signal "x" is expressed by the following linear expression:

$$x=y\cdot A+B.$$

As for the combination of the parameters A and B in this expression, two combinations of (A, B)=(A2, B2) and (A, B)=(A3, B3) are previously prepared. The magnitude is compared between the clamping effect Y/N determination reference level COUNT_B, which is defined by the reference object reflectance (36%), and the AF signal "y". And based on the result, using any one of the above conversion expressions, the AF signal "y" is converted into the distance signal "x".

Referring to the reference letters and numerals in FIG. 7, the prepared parameters A2 and B2 are expressed by the following expressions (1) and (2), and the conversion expression thereof is expressed by (3).

$$A2=(x3-X2)/(y3-y2) \tag{1}$$

$$B2=X2-y2\cdot A2 \tag{2}$$

$$X=y\cdot A2+B2 \tag{3}$$

Also, the parameters A3 and B3 are expressed by the following expressions (1) and (2), and conversion expression thereof is expressed by (3).

$$A3=(X5-X4)/(y5-y4) \tag{4}$$

$$B3=X4-y4\cdot A3 \tag{5}$$

$$X=y\cdot A3+B3 \tag{6}$$

As demonstrated by the above expressions, the combination (A, B)=(A2, B2) is converted into a distance signal in the long-range side longer than the combination (A, B)=(A3, B3).

As for the reference object reflectance, the distance L corresponding to the clamping effect Y/N determination reference level COUNT_B is L4, and the COUNT_B is equal to y4. That is, in the range of distance L≦L4, the combination (A, B)=(A2, B2) is adopted (step S70, step S60).

Based on the adopted conversion expression (3) or (6), the AF signal y is converted into a distance signal X (step S80) Here, the converted distance signal X is checked that the same is not smaller than the infinity signal value AFINF (at long range side), and when the same is smaller, the infinity signal value AFINF is reset as the distance signal, the processing is terminated (step S90, step S30).

The parameters A2 (expression (1)), B2 (expression (2)), A3 (expression (4)) and B3 (expression (5)), and a standard range of the luminance of the outside light (i.e., determination criterion for selecting which conversion expression should be selected from the expressions (3) and (6)) are obtained for each camera in which the distance measuring device is incorporated during the manufacturing thereof, and previously stored in the EEPROM 2 or the like. These parameters read out by the CPU 1 at distance measurement, and the operation of expression (3) or (6); and thus, the AF signal "y" is converted into distance signal "x".

Figure 8:
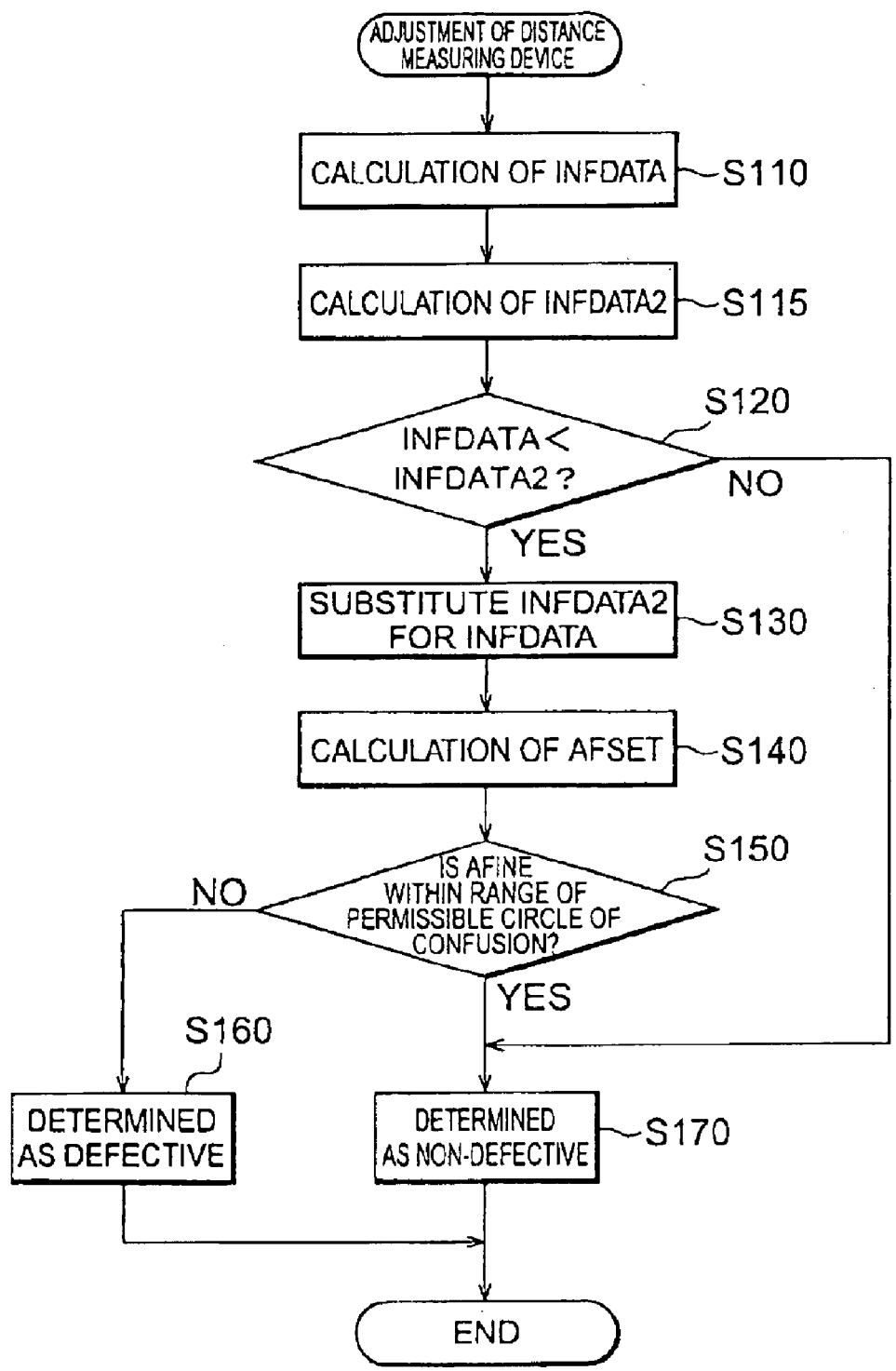
FIG. 8 is a flow chart showing the adjustment of the distance measuring device in a camera in accordance with the embodiment.

Next, the setting method of the above-mentioned infinity determination threshold value (INFDATA) in the above-described adjustment of the distance measuring device will be described with reference to FIG. 8. FIG. 8 is a flow chart showing the setting method of the infinity determination threshold value. As described above, the infinity determination threshold value, which is set up here, is obtained at manufacturing of the camera into which the distance measuring device is incorporated, stored in the EEPROM 2 or the like, read out by the CPU 1 at the distance measurement, and used at the above-described processing.

First of all, the AF signal corresponding to the limit distance (infinity determination distance 1) capable of distinguishing the noise due to the external light from the AF signal, which is previously designed, is obtained using the following expression:

$$\text{INFDATA} = (\text{AFSET1} - B3)/A3 \tag{7}$$

The result is used as the infinity determination threshold value (INFDATA) (step S110). Here, the AFSET1 is the distance signal corresponding to the infinity determination distance 1.

Figure 9:
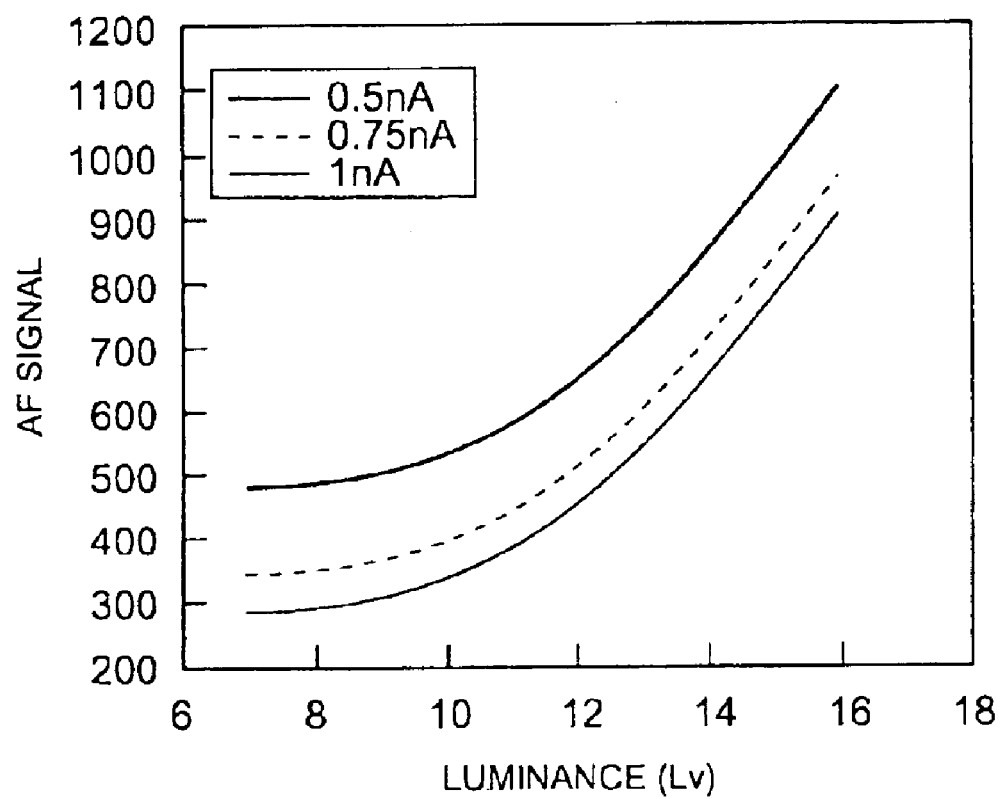
FIG. 9 is a graph showing an AF signal value with respect to the external luminance.

Then, the AF signal level corresponding to the switchover luminance is obtained using FIG. 9 as the second threshold value (INFDATA2) (step S115). FIG. 9, which is used here, is a graph showing a relationship between the luminance of the outside light, which is obtained by the photometry sensor 71, and the AF signal corresponding thereto, which is obtained by the PSD 5. That is, the relationship between the AF signal output from the AFIC 10 and the luminance in the state where the object to be measured is located at a position equivalent to the infinite long distance (the state where the infrared light emitted from the IRED 4 does not reach the PSD 5 as reflected light) is represented. The graph shown in FIG. 9 is prepared beforehand by obtaining average data of the relationship between the luminance of the outside light and the AF signal using plural prototypes of the camera. The graph in FIG. 9 is prepared by, for example, after sealing AF window (light projection) 22a with a light shielding tape, measuring the AF signal while changing the luminance of the outside light. Here, while measuring the luminance of the outside light, the corresponding AF signals may be measured in the field; or, after setting the camera faced to a luminance box, the AF signal may be measured while changing the luminance.

Figure 10:
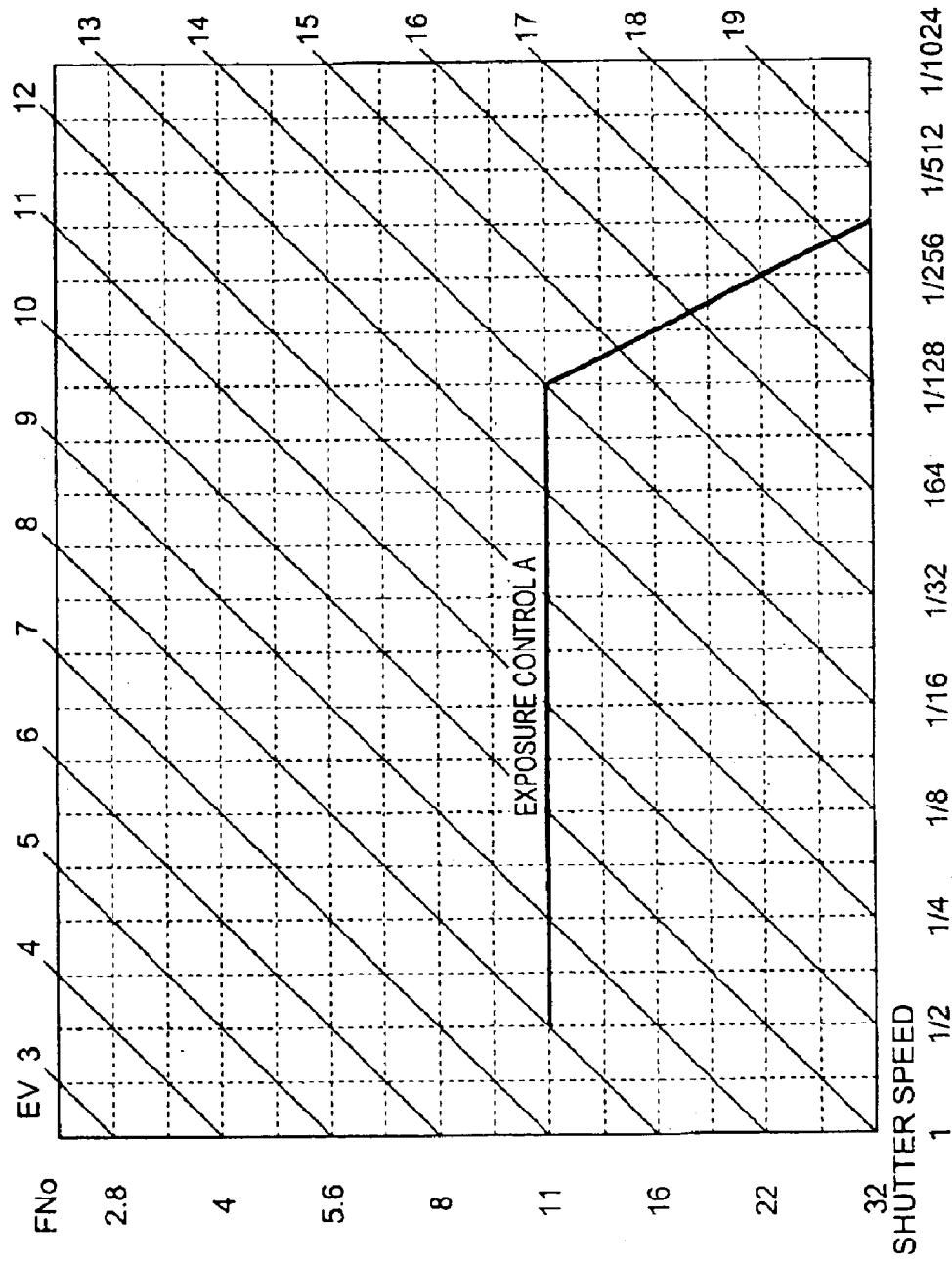
FIG. 10 is a diagram of the exposure control program.

Here, the wording "switchover luminance" means the luminance, which is designed so that, in a predetermined program diagram of the film sensitivity, the exposure control program is switched over and the aperture of the lens begins to be narrowed down from the released state. That is, when the luminance of the outside light, which is measured by the photometry sensor 71, is lower than the above-mentioned switchover luminance, the exposure control program of the camera in accordance with the embodiment controls to set the aperture value of the lens to a released aperture value, and in the case other than that, controls the aperture value of the lens to increase corresponding to the increase of the luminance. FIG. 10 is a program diagram showing the relationship among the shutter speed, F number and exposure value in a certain predetermined film sensitivity of the exposure control program. For example, referring to FIG. 10, in the exposure control in the predetermined film sensitivity, the program diagram turns at a point of F-number=11 and the exposure value EV=14, the luminance equivalent to EV=14 is determined as the switchover luminance. In the case where the luminance equivalent to EV=14 in the predetermined film sensitivity is Lv14, referring to FIG. 9, the AF signal level corresponding to Lv14 is obtained. Each of the three curves represents the relationship between the luminance and the AF signal in the case of 0.5 nA, 0.75 nA and 1 nA, respectively, in the level of the clamp signal. For example, in the camera of which clamp signal level is set to 0.75 nA, the infinity determination threshold value is obtained based on the curve of 0.75 nA. When the luminance of the outside light is Lv14, an AF signal value on the corresponding curve is adopted, and the second threshold value is set to 740.

Depending on the differences or the like in the assembly of camera, there may be a case where the AF signal level of the second threshold value is larger than that of the above-described infinity determination threshold value (second threshold value indicates the short range side shorter than the above-mentioned determination threshold value). In such case, the second threshold value is adopted again as the infinity setting threshold value (step S120, step S130). In the cases other than that, the infinity determination threshold value, which has been previously obtained by the expression (7), is adopted as it is, and the camera is determined as non-defective (step S170); and thus, the process is terminated.

Figure 11:
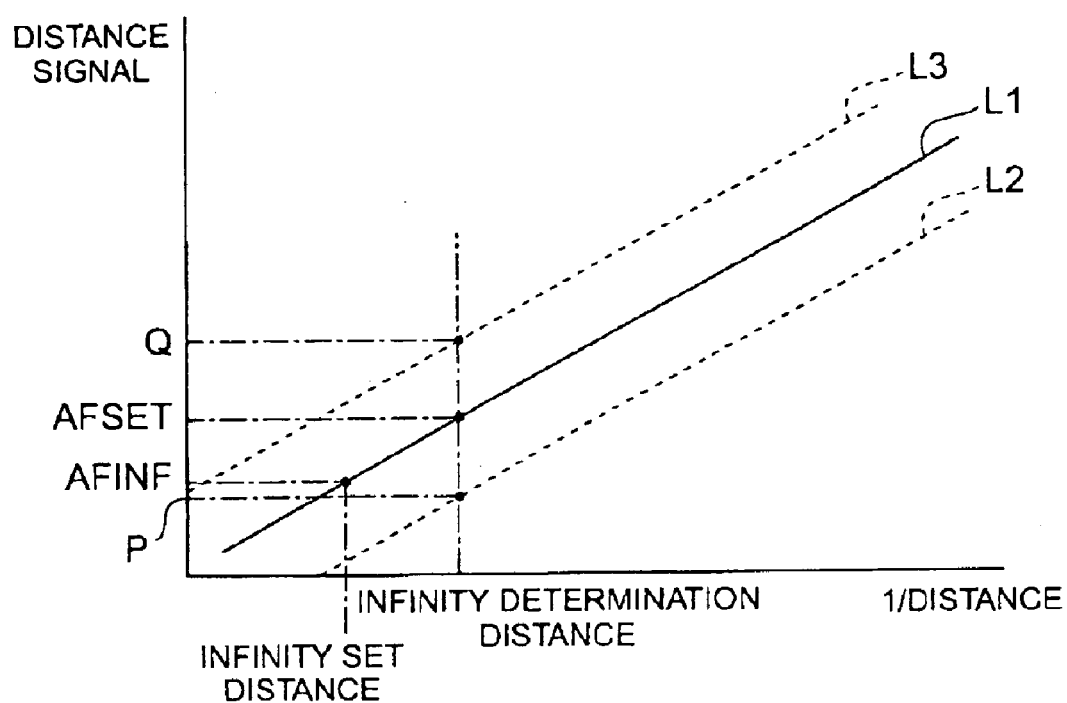
FIG. 11 is a graph showing the relationship between the reciprocal (1/L) of the distance and the distance signal value.

Hereinafter, the steps of the defect determination of camera, which is carried out when the second threshold value is set up as the infinity determination threshold value (INFDATA), will be described with reference to FIG. 11 as well as FIG. 8. The graph of full line in FIG. 11 represents the relationship between the reciprocal (1/L) of the distance and the distance signal value; the abscissa axis of the graph represents the reciprocal (1/L) of the distance; and the ordinate axis represents the distance signal value. Further, the broken lines in the upper and lower areas of the full line represent the upper and lower limits of the range of permissible circle of confusion, respectively. When the relationship between the reciprocal (1/L) of the distance and the distance signal value is within the area enclosed by the upper and lower broken lines, it means that the out-of-focus is within the permissible range.

First, the distance signal (AFSET) corresponding to the set up infinity determination threshold value (INFDATA) is calculated (step 140). The distance signal (AFSET) can be calculated by substituting x=AFSET and y=INFDATA into the expression (6), and by using the obtained expression (8):

$$\text{AFSET} = \text{INFDATA} \times A3 + B3 \tag{8}$$

Then, the distance (infinity determination distance) corresponding to the AFSET is obtained by drawing a line with respect to the full line graph L1 in FIG. 11. The 1/L can be found by determining the AFSET on the ordinate axis and then, on the full line graph L1, by searching for the corresponding 1/L on the abscissa axis. Then, based on the infinity determination distance, using the broken line graphs L2 and L3, the range of the distance signal value, which corresponds to the range of permissible circle of confusion, is obtained by drawing lines. The infinity determination distance is determined on the abscissa axis, and is then, P and Q, which correspond on the broken line graph respectively, is determined on the ordinate axis. The range between the distance signals P-Q is the "range of the distance signal value, which correspond to the range of permissible circle of confusion in the infinity determination distance that is the nearest distance within the distance to be subjected to the infinity determination."

Then, an infinity signal value (AFINF), which is the distance signal value corresponding to the infinity set distance, is obtained from the full line graph L1 by drawing a line. The wording "infinity set distance" means a limited distance, which is defined from the viewpoint of the designing of the camera so that the distance is included within the range of a predetermined out-of-focus up to the infinity. The infinity set distance is determined on the abscissa axis, and on the ordinate axis, the corresponding distance signal value is determined on the full line graph L1. Then, the infinity set distance, which is previously set up, is determined on the abscissa axis, and based on the graph, the distance signal on the corresponding ordinate axis is determined by drawing a line; thus, the infinity signal value AFINF corresponding to the infinity set distance is obtained.

Next, it is checked if the obtained AFINF is within the range (P-Q) of the distance signal value, which corresponds to the range of the permissible circle of confusion in the above-described infinity determination distance (step S150). When the AFINF is out of the above range, the camera is determined as defective camera, which cannot be adjusted (step S160). In the case other than the above, the camera is determined as non-defective product, which has been adjusted (step S170), and the processing is terminated.

Figure 12A:
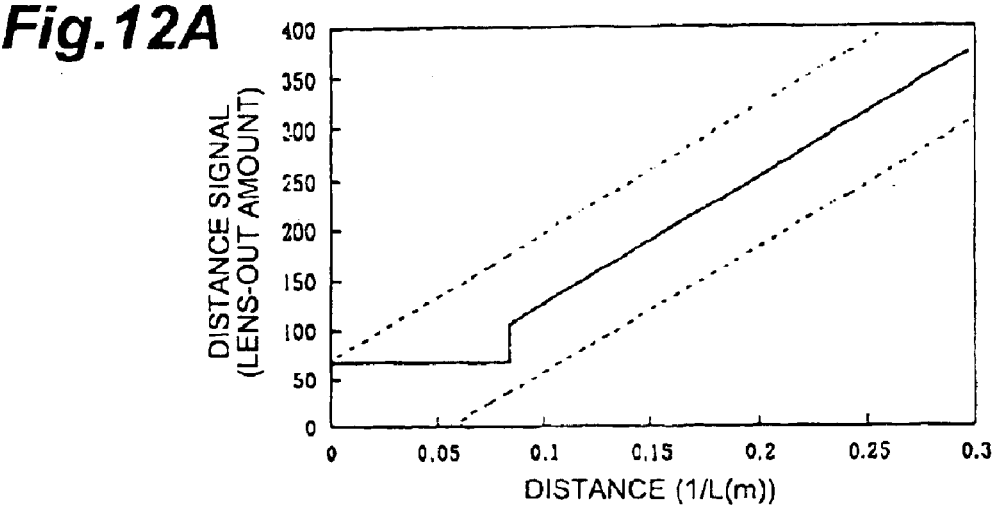
FIGS. 12A–12C are diagrams showing the distance measuring property of the camera in accordance with the embodiment.
Figure 12B:
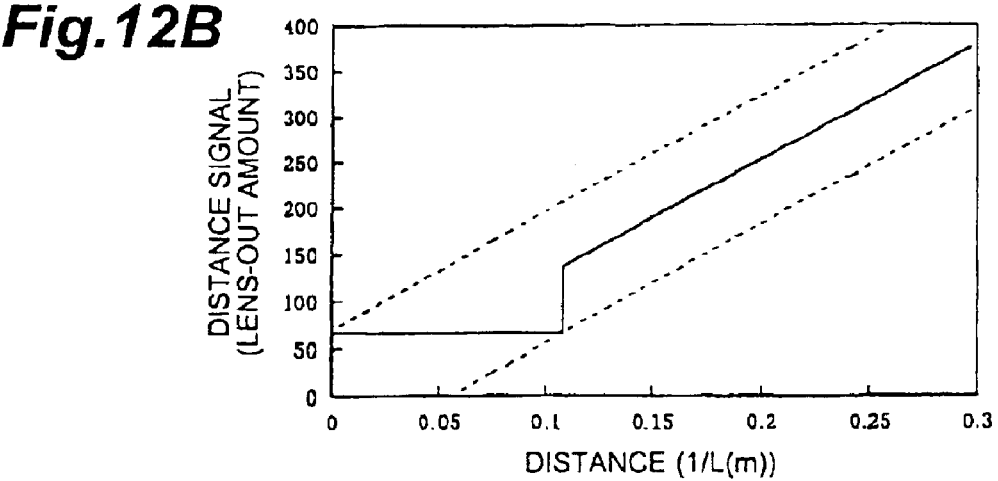
Figure 12C:
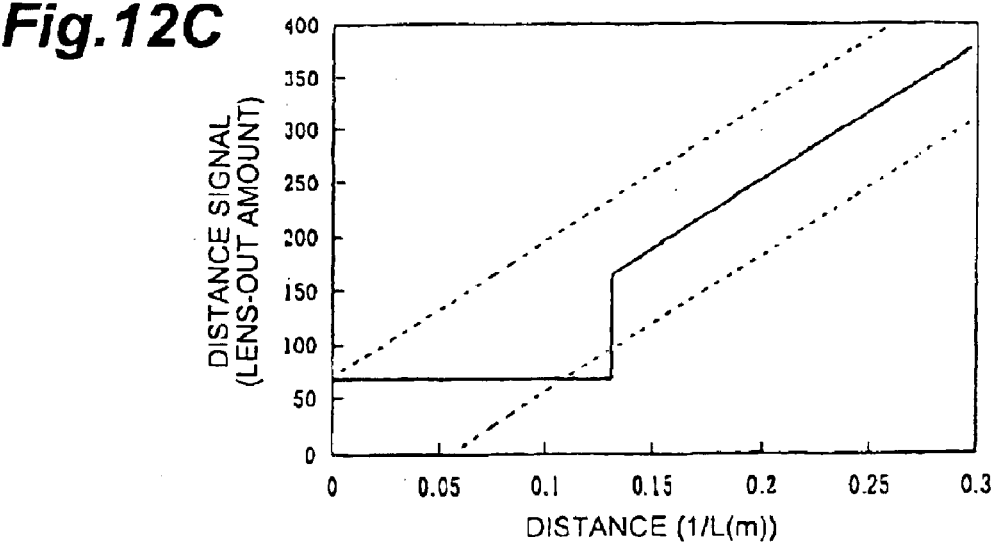

FIGS. 12A–12C are diagrams showing the relationship (distance measuring property) between the distance and the distance signal of the camera in accordance with the embodiment. FIG. 12A shows an example of camera, which is determined as non-defective product. In this example, since the AF signal value corresponding to the distance signal 106 is the infinity determination threshold value, the infinity determination is made at a point where the 1/L (reciprocal of the distance) is 0.083. That is, the distance equivalent to the 1/L=0.083 is the infinity determination distance. In the case of this example, since the infinity signal value corresponding to the infinity set distance is 67, thus, the value is included in the range 36–176 of the distance signal of the range of permissible circle of confusion when the infinity determination distance is 1/L=0.08. Accordingly, the camera is determined as non-defective. FIG. 12A is a graph of the distance measuring property of a camera, which is on the non-defective limit. The AF signal value corresponding to the distance signal 137 is the infinity determination threshold value. The infinity determination is made at a point where the infinity determination distance is 1/L=0.11, the range of the distance signal, which corresponds to the range of permissible circle of confusion at this distance is 67–207; thus the infinity signal value 67 corresponding to the infinity set distance is included being on the limit line.

FIG. 12C shows an example of camera, which is determined as defective product. In this case, the AF signal value corresponding to the distance signal 165 is the infinity determination threshold value, and the infinity determination is made at 1/L=0.13. That is, the distance of 1/L=0.13 is the infinity determination distance. Here, in the camera with such distance measuring property, although the distance signal at 1/L=0.13 is determined as the infinity resulting in 67, the distance signal value corresponding to the range of permissible circle of confusion is 95–235. Accordingly, in this camera, the distance signal is not included in the range of permissible circle of confusion at 1/L=0.13; thus the camera is determined as defective product.

As described above, by adjusting the distance measuring device, in the case where the second AF signal value, which corresponds to the switchover luminance, is larger than the first AF signal value, which corresponds to the preset infinity determination distance (the threshold value of the second AF signal value indicates the short-range side shorter than the first AF signal value), the second AF signal value is set up as the infinity determination threshold value. As for the AF signal in the long range longer than the distance corresponding to the signal value of the second AF signal value, every signal is output as the distance signal of the infinity setting value. That is, it is arranged so that, due to the causes such as the difference of camera, even when the AF signal value corresponding to the switchover luminance is larger than the conventional infinity determination threshold value, the AF signal value corresponding to the switchover luminance is newly set up as the infinity determination threshold value; thereby, even when the obtained AF signal value is in the long range longer than the distance where the noise and the AF signal are distinguished from each other, a stable infinity determination cab be made. Also, since such control to narrow down the aperture of lens is not necessary, the shutter speed can be appropriately ensured.

Further, in the case where the second AF signal value (second threshold value) is set up as the infinity determination threshold value, since the infinity distance determination threshold value is resulted in a large value, compared to the distance corresponding to the first AF signal value (first threshold value), the infinity determination is made in a shorter range. Accordingly, there may be a case where the infinite distance determination is made irrespective of the fact that the actual distance to the object to be measured is in the short range. As a result, when the second AF signal value is too large, there may be a case that the range of permissible circle of confusion is exceeded. Accordingly, by carrying out the defective product determination as described above, every camera which may cause out-of-focus is determined as defective product, and only the camera which surely falls in the permissible circle of confusion in every range is selected as non-defective product.

Here, the reason the infinity signal value and the distance signal value, which correspond to the range of permissible circle of confusion in the infinity determination distance, are selected as the comparison objects is why the shape of the graph (for example, refer to FIG. 12A) of the distance measuring property, which represents the relationship between the actual distance with respect to the camera and the distance signal is taken into consideration. That is, as shown in FIG. 12A, the graph has such shape that in the short-range side shorter than the infinity determination distance, the graph of the distance measuring property becomes a straight line, which represents substantially proportional relationship between the 1/L and the distance signal value; in the long-range side longer than the infinity set distance, the distance signal value is a constant value of the AFINF. Accordingly, when the infinity signal value is within the above-described range, it can be determined that the entire graph of the distance measuring property is surely within the range enclosed by the graphs of broken lines, which represent the range of permissible circle of confusion. Accordingly, the camera, which has the distance measuring property as described above, can be determined such that the entire range of the distance measuring result is surely included within the range of the permissible circle of confusion. Furthermore, taking the shape of the graph into consideration, it may be arrange so that, using the distance signal value (P in FIG. 11) only that corresponds to the infinity signal value and the infinity limit of the range of permissible circle of confusion as the comparison object, when the infinity signal value is the signal which falls in the long range side longer than the distance signal value, which corresponds to the infinity limit of the range of permissible circle of confusion.

Figure 13:
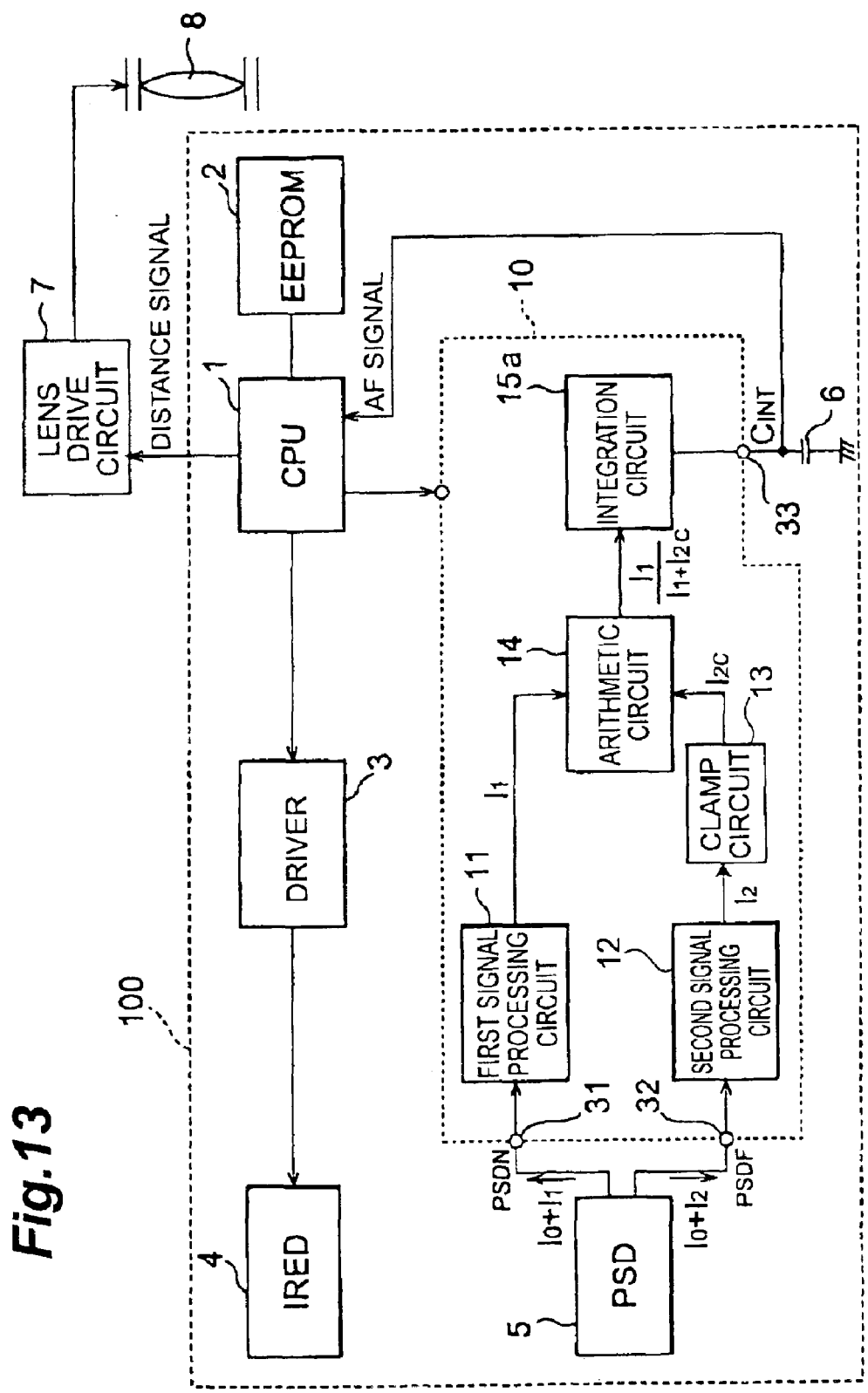
FIG. 13 is a diagram showing the configuration of a distance measuring device for a camera in accordance with a modification of the embodiment.
Figure 14:
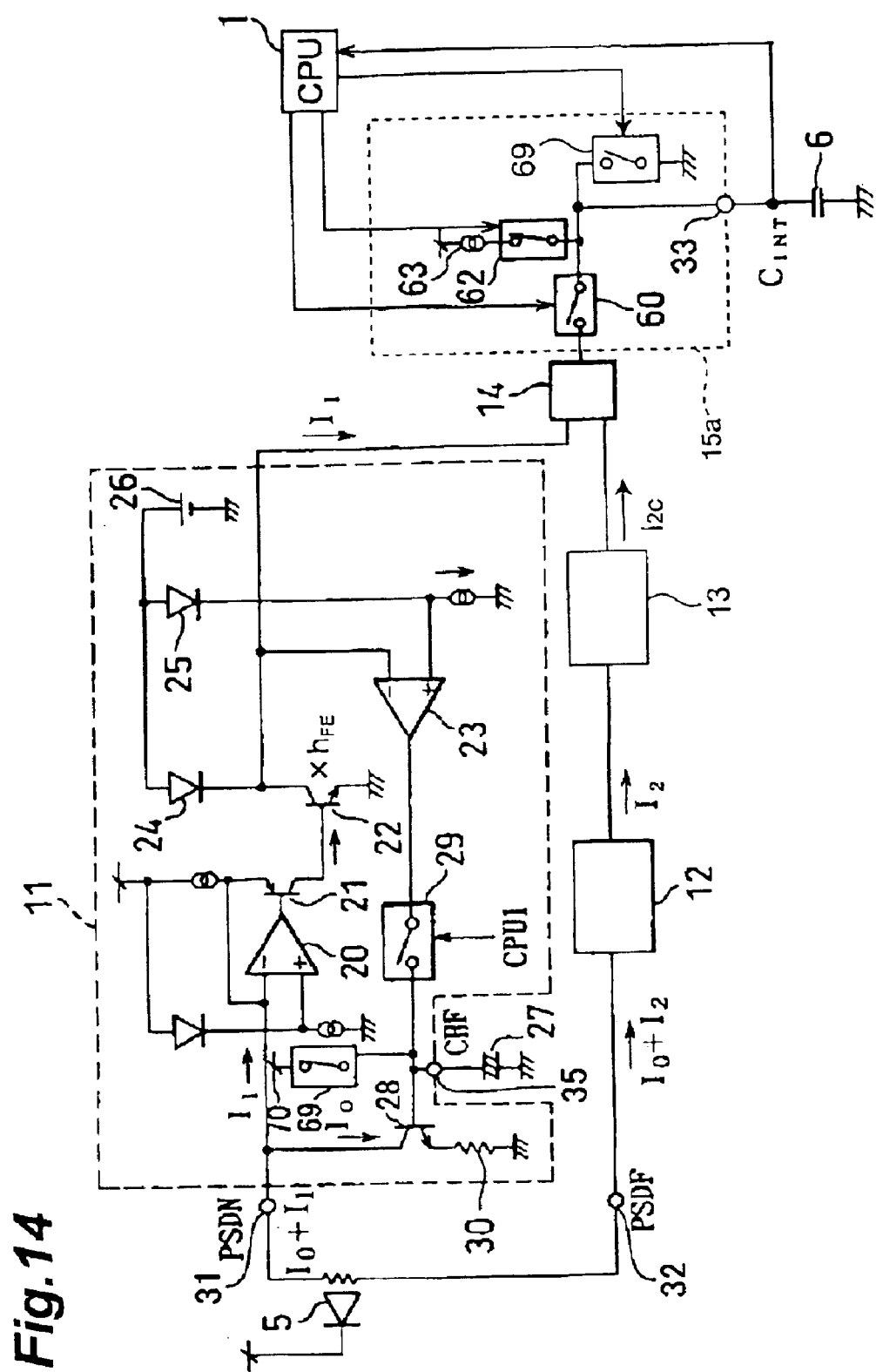
FIG. 14 is a circuit diagram of the first signal processing circuit and the output circuit in the distance measuring device according to the modification of the embodiment.
Figure 15:
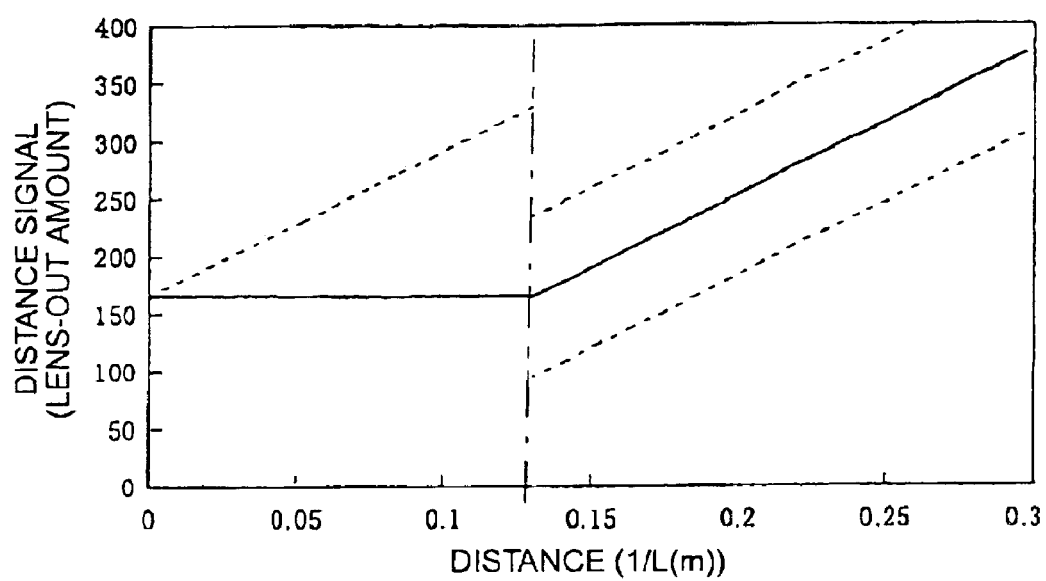
FIG. 15 is a graph showing the distance measuring property with respect to a distance measuring device of a conventional camera.

In the above-described embodiment, when converting the output ratio signal into the AF signal, the potential of the integration capacitor 6 is monitored to obtain the AF signal using the integration circuit 15 based on the time required to recover to the pervious potential. However, as shown in FIG. 13, an integration circuit 15a may be used in place of the integration circuit 15.

In this case, the integration circuit 15a receives the input of an output ratio signal (a distance calculation value) and integrates the output ratio multiple times along with the integration capacitor 6, which is connected to a CINT terminal 33 of the AFIC 10; thereby the S/N ratio is improved. And the CPU 1 receives the integrated output ratio as the AF signal (distance measuring data). When the CPU 1 receives the AF signal from the AFIC 10, the CPU 1 performs a predetermined calculation to convert the AF signal into the distance signal, and sends the distance signal to the lens drive circuit 7. The lens drive circuit 7 makes the photographic lens 8 carry out the focusing operation based on the distance signal.

The integration circuit 15a has the following configuration. Referring to FIG. 8, the integration capacitor 6, which is externally connected to the CINT terminal 33 of the AFIC 10, is connected to the output terminal of the arithmetic circuit 14 being interposed by the switch 60, connected to the current generator 63 being interposed by the switch 62 and grounded being interposed by the switch 69. The CPU 1 reads out the potential of the integration capacitor 6 as described above. The switches 60, 62, and 69 are controlled by the control signal from the CPU 1.

At the beginning of the distance measurement, the switches 60 and 62 are turned off, and the switch 69 is turned on for a predetermined period of time, and the integration capacitor 6 is discharge to 0 volts. When the IRED 4 emits pulse light predetermined times, the switch 60 of the integration circuit 15a is turned on, and the switches 62 and 69 are turned off. The integration capacitor 6 of the integration circuit 15a receives the output ratio; i.e., the distance calculation value, which is output from the arithmetic circuit 14, and is charged up to the voltage value corresponding to the value of the distance calculation value. Owing to this, the voltage of e the integration capacitor 6 increases in a step-like pattern being input with the distance calculation value every time of light emission of the IRED 4. The increasing amount of the voltage itself in a step-like pattern is the distance information corresponding to the distance to the object to be measured. However, in this embodiment, the sum of the increased voltage, which is obtained by each pulse light emission of the IRED 4, is used as the distance information.

After completing the input to the integration capacitor 6 with the distance calculation value of predetermined times of light emission, the switch 60 is turned off and the CPU 1 A/D converts the voltage of the integration capacitor 6 to read the same, and reads out the integration result of the distance calculation value as the AF signal (distance measuring data).

The present invention is not limited to the above-described embodiments, but various modifications are possible. For example, although in the above-described embodiments, the present invention is applied to the camera of active AF system, the present invention may be applied to a digital steel camera, which uses the same AF system.

As described in detail, according to the present invention, a camera, which is capable of performing appropriate infinity determination while ensuring the shutter speed and performing appropriate focusing operation, can be provided.

What is claimed is:

1. A camera comprising:
light emitting means that projects a beam of light onto an object to be measured;
light detecting means that detects the light projected toward and reflected from the object at a light detecting position corresponding to a distance to the object, and, based on the light detecting position, outputs a long-range side signal that increases in value as the object is positioned farther from said camera at a certain intensity of the detected light, and a short range side signal that increases in value as the object is positioned closer to said camera at a certain intensity of the detected light;
clamping means that compares the long-range side signal with a clamp signal, and, when the long-range side signal is larger than the clamp signal in value, outputs said long-range side signal and, when the long-range side signal is smaller than the clamp signal in value, outputs the clamp signal;
calculation means that calculates a ratio between the short-range side signal and the signal output from said clamping means and outputs an output ratio signal;
conversion means that compares the output ratio signal with a predetermined infinity determination threshold value to determine whether the value of the output ratio signal corresponds to a shorter range side rather than the value of the infinity determination threshold value and, if so, converts the output ratio signal into a distance signal that is correlated with the distance of the object from said camera, and, if not, converts the output ratio signal into a predetermined distance signal having a fixed value;
luminance measuring means that measures the luminance of outside light; and
exposure control means that, when the luminance of the outside light measured by said luminance measuring means is lower than a switchover luminance, which is determined based on film sensitivity, controls a lens aperture to a fully open aperture value, and, when the luminance of the outside light is higher than the switchover luminance, increases the lens aperture according to the luminance of the outside light, wherein
the infinity determination threshold value is set at the value that corresponds to the shorter range side among a first auto-focus (AF) signal and a second AF signal,
the first AF signal corresponds to the infinity determination distance that is set as the farthest distance measurable by said camera; and
the second AF signal is determined based on the switchover luminance.

2. A camera comprising:
light emitting means that projects a beam of light onto an object to be measured;
light detecting means that detects the light projected toward and reflected from the object at a light detecting position corresponding to a distance to the object, and, based on the light detecting position, outputs a long-range side signal that increases in value as the object is positioned farther from said camera at a certain intensity of the detected light, and a short-range side signal that increases in value as the object is positioned closer to said camera at a certain intensity of the detected light;
clamping means that compares the long-range side signal with a clamp signal, and, when the long-range side signal is larger than the clamp signal in value, outputs said long-range side signal and, when the long-range side signal is smaller than the clamp signal in value, outputs the clamp signal;
calculation means that calculates a ratio between the short-range side signal and the signal output from said clamping means and outputs an output ratio signal;
conversion means that compares the output ratio signal with a predetermined infinity determination threshold value to determine whether the value of the output ratio signal corresponds to a shorter range side rather than the value of the infinity determination threshold value, and, if so, converts the output ratio signal into a distance signal that is correlated with the distance of the object from said camera, and, if not, converts the output ratio signal into a predetermined distance signal having a fixed value;
luminance measuring means that measures the luminance of outside light; and exposure control means that, when the luminance of the outside light measured by said luminance measuring means is lower than a switchover luminance, which is determined based on film sensitivity, controls a lens aperture to a fully open aperture value, and, when the luminance of the outside light is higher than the switchover luminance, increases the lens aperture according to the luminance of the outside light, wherein an AF signal value corresponding to the switchover luminance is set as the infinity determination threshold value, and an infinity signal value, which is a distance signal value corresponding to an infinity set distance, is within a distance signal value corresponding to a range of a permissible circle of confusion in an infinity determination distance, which is nearest distance of distances subjected to an infinity determination.

3. The camera according to claim 1, wherein the AF signal is the output ratio signal.

4. The camera according to claim 1, wherein an aperture in said camera is regulated to decrease as the aperture value increases.

5. The camera according to claim 1, wherein, when the infinity determination threshold value is set at the value of the second AF signal, a fixed value of the predetermined distance signal is within a range of a permissible circle of confusion of said camera when the object is placed at a point that yields the infinity determination threshold value.

* * * * *